(12) United States Patent
Augustsson

(10) Patent No.: US 7,035,500 B2
(45) Date of Patent: Apr. 25, 2006

(54) MULTI-MODE INTERFERENCE WAVEGUIDE BASED SWITCH

(75) Inventor: Torsten Augustsson, Vasby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/490,840

(22) PCT Filed: Sep. 27, 2002

(86) PCT No.: PCT/SE02/01766

§ 371 (c)(1),
(2), (4) Date: Aug. 30, 2004

(87) PCT Pub. No.: WO03/027740

PCT Pub. Date: Apr. 3, 2003

(65) Prior Publication Data

US 2005/0013530 A1    Jan. 20, 2005

(30) Foreign Application Priority Data

Sep. 28, 2001  (SE) .................................. 0103246

(51) Int. Cl.
*G02B 6/26* (2006.01)
*G02B 6/42* (2006.01)

(52) U.S. Cl. .................. 385/17; 385/16; 385/20; 385/21; 385/24; 385/47

(58) Field of Classification Search ........... 385/16, 385/17, 20, 21, 24, 35, 37, 47

See application file for complete search history.

(56) References Cited

U.S. PATENT DOCUMENTS

| 5,933,554 A | 8/1999 | Leuthold et al. |
| 5,953,467 A * | 9/1999 | Madsen ................... 385/15 |
| 6,055,992 A * | 5/2000 | Skarne .................. 132/293 |
| 6,222,958 B1 * | 4/2001 | Paiam ..................... 385/24 |
| 6,571,031 B1 * | 5/2003 | Augustsson ............. 385/24 |

FOREIGN PATENT DOCUMENTS

| EP | 0933963 | 8/1999 |
| WO | WO 9325923 A1 | 12/1993 |

\* cited by examiner

*Primary Examiner*—Frank G. Font
*Assistant Examiner*—Charlie Peng

(57) ABSTRACT

The present invention relates to device for space selective switching of an optical signal from an input access waveguide to a first selected output access waveguide. Said device comprising a multi-mode interference (MMI) waveguide having at a first side a number, N, of accesses for connection of access waveguides. Said MMI waveguide having a length, in light propagating direction, so that an image at the i:th, i≦N access waveguide propagating into said MMI waveguide will produce N self-images at a second side opposite to said first side, where N is an integer than 1. Said device further comprises reflective means located in said MMI waveguide close to said second side, arranged to reflect said N self-images towards said first side of said MMI waveguide, and means, arranged at said second side, for adjusting the phase of each of said self-images to create a single self-image at said selected output access waveguide.

11 Claims, 4 Drawing Sheets

MULTI-MODE INTERFERENCE WAVEGUIDE BASED SWITCH

TECHNICAL FIELD

The present invention relates to a multi-mode interference waveguide based space switch and more in particular to a compact such multi-mode interference waveguide switch and a method for switching optical light signals.

BACKGROUND OF THE INVENTION

There is a strong need to increase the capacity and flexibility of photonic transport networks. The evolving telecommunication networks are increasingly focusing on flexibility and reconfigurability, which requires enhanced functionality of photonic integrated circuits (PICs) for optical communications, as well as compact devices. The interest for multi-mode interference (MMI) effects in integrated optics for single-mode transmission systems has recently been increasing. Optical devices based on MMI effects have large optical bandwidth, are polarization insensitive and sustain high fabrication tolerances to mention a few advantages. The operation of MMI waveguide devices is based on the self-imaging principle and is further described in "Optical Multi-Mode Interference Devices Based on Self-Imaging: Principles and Applications" by L. B Soldano and E. C. M. Pennings published in J. of Lightwave Technology, Vol. 13, No. 4 Apr. 1995.

MMI waveguide devices have applications in a number of different areas. For instance, as a wavelength selective switch, as described in "Bragg grating assisted MMIMI coupler for wavelength selective switching" by the present inventor published in Electronics Letters $10^{th}$ Dec. 1998, Vol. 34, No. 25. In this paper the present inventor describe a novel optical device for wavelength selective switching. The device is based on a Bragg grating assisted MMIMI (multi Mode Interference Michelson Interferometer) coupler.

Another application for a MMI waveguide device is as coupler, as described in the paper "Multimode Interference Couplers with Tuneable Splitting Ratios" by J. Leuthold and C. H. Joyner, published in Proc. ECOC 2000, September, Münich Vol. 3. In this paper the authors present a novel, compact multi-mode interference coupler with tuneable power splitting ratios. The coupler has large tuning ranges and is used to optimise on-off ratios in interferometric devices or even as a switch.

The need to be able to space switch signals in optical telecommunication networks is apparent. Simple space switching of broadband signals allows routing based on for instance available capacity or rerouting around parts of the network currently unavailable.

Prior art optical switches currently face problems with high losses, high cross talk or high requirements on fabrication tolerances. They may also have stability problems or have high power consumption.

SUMMARY OF THE INVENTION

The object of the present invention is to avoid or reduce the above-mentioned problems, as well as to provide a compact switching device and a method for switching optical signals.

The present invention thus provides a compact multi-mode interference switch wherein an optical input signal, at a first side of an MMI waveguide, is selectively routed to an output access waveguide selected from a number of output access waveguides by tuning the phase front of self-images of said optical input signals, and reflecting said self-images from a second side of said MMI waveguide, towards said first side by reflective means.

One advantage with the present invention is that a very compact switching device is achieved. A further advantage is the provision of a stable device having low losses. Yet another advantage is that the switch thus provided will have low cross talk.

In greater detail, said phase tuning is achieved by providing M phase shifters, where M is an integer, and where each of said phase shifters is arranged to individually tune the phase of N self-images at said second side. The MMI waveguide is arranged so that an input light signal at an access waveguide, located at one side in said MMI waveguide, is divided into N self-images at a second side of said MMI waveguide. Each of these self-images will have an individual phase at the position of said second side, thus creating a phase distribution over the M phase shifters. The phase shifters are controllable so as to tune the phase distribution of said self-images, to coincide with a phase distribution of self-images at said second side that would be produced by an optical light signal at said selected output access waveguide.

In a preferred embodiment N and M are equal. That is, M=N phase shifters tune the phases of N=M self-images.

According to one aspect of the invention each of said phase shifters comprises a light transparent part having a first refractive index and means for tuning said refractive index.

Said tuning can be performed, according to a preferred embodiment, by making the refractive index of said light transparent part sensitive to heat and controlling the heat of said tuning means to effectively control the refractive index of said light transparent part. Thereby, it is possible to control the optical path length of the incident light and thus the phase for each self-image.

According to another preferred embodiment of the invention, the refractive index of said light transparent part is sensitive to current through or voltage across said part. Controlling the current or voltage and thus the refractive index, then performs the tuning.

According to another aspect of the present invention each of said phase shifters comprise reflective means. Each of said phase shifters are arranged so that the individual positions of said reflective means are controllable in a direction parallel to the direction of propagating light in said MMI waveguide. Thereby, it is possible to control the length of the geometrical distance, and thus the optical path length, of incident light and thus the phase of said self-images.

According to another preferred embodiment said phase shifters comprise a thermo-expansion section which, depending on an applied temperature, moves reflective means in a direction parallel to the direction of propagating light in said MMI waveguide.

According to yet another preferred embodiment said phase shifters comprise micro-mechanical phase tuning means arranged to controllably move reflective means in a direction parallel to the direction of propagating light in said MMI waveguide.

PREFERRED EMBODIMENTS

Figure 1:
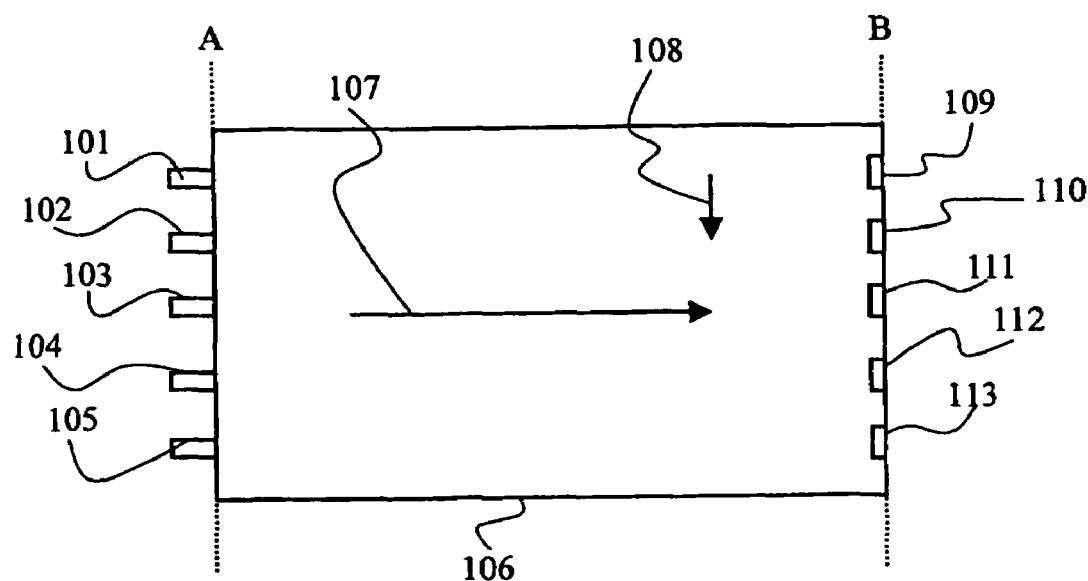
FIG. 1 shows a schematic view of a multi-mode interference device according to a first preferred embodiment of the invention.

FIG. 1 shows a schematic drawing of a multi-mode interface device according to a first preferred embodiment of the invention. To the left, at the interface A, five access waveguides are denoted 101 to 105 respectively. The length and width of the waveguide 106 are adapted so that an input image at an access waveguide will produce 5 self-images at the interface B. The light propagation direction is denoted 107 and the perpendicular direction 108. It shall be noted that the light also can propagate in the opposite direction to direction 107.

Figure 2:
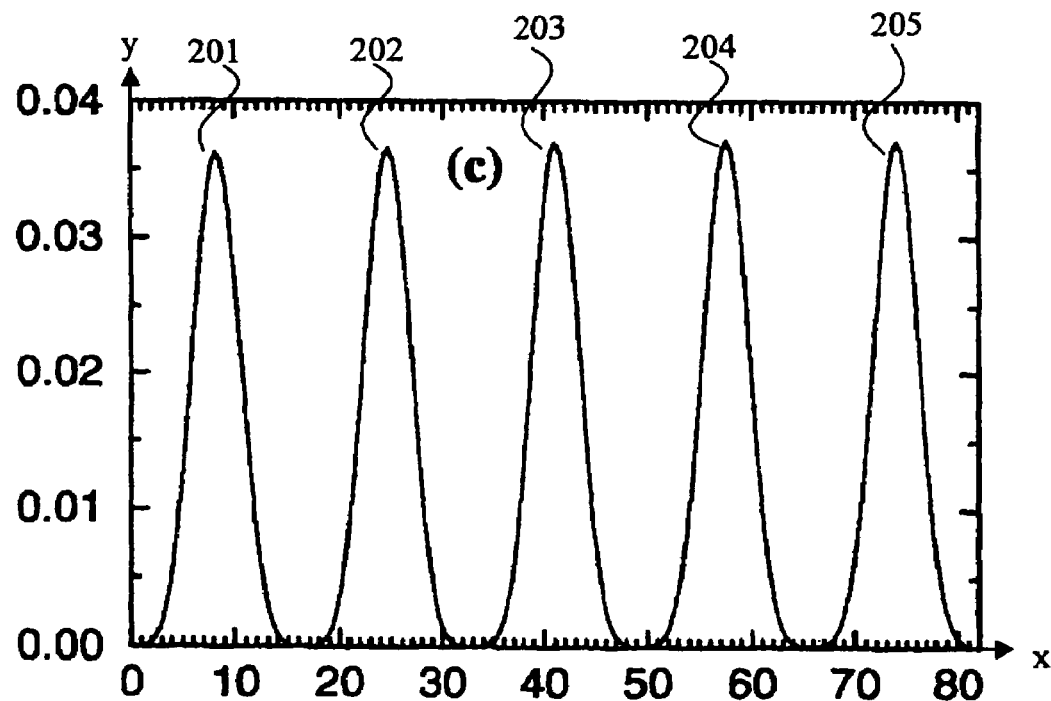
FIG. 2 shows a power distribution at the interface B for the wavelength in question in FIG. 1.

FIG. 2 shows the power distribution at the interface B for a signal entering the MMI waveguide in FIG. 1 at access waveguide 101. Each power peak, denoted 201–205, respectively, represents a self-image and appears evenly distributed at the interface B. In other words, the X-axis in FIG. 2 is oriented in FIG. 1 in the perpendicular direction 108. Input from the other access waveguides 102–105 will produce similar power distributions or self-images at the interface B. The power distribution difference at interface B between different input access waveguides will be negligible with a correct design of the MMI waveguide.

The optical bandwidth of the MMI waveguide is inversely proportional to the number of input and output waveguides. The bandwidth properties of MMI waveguides are more thoroughly worked out in "Optical Bandwidth and Fabrication Tolerances of Multimode Interference Couplers" by P. A. Besse, M Bachmann, H. Melchior, L. B. Soldano, and M. K. Smit published in J. of Lightwave Technology, Vol. 12, No. 6, June 1994.

Figure 3A:
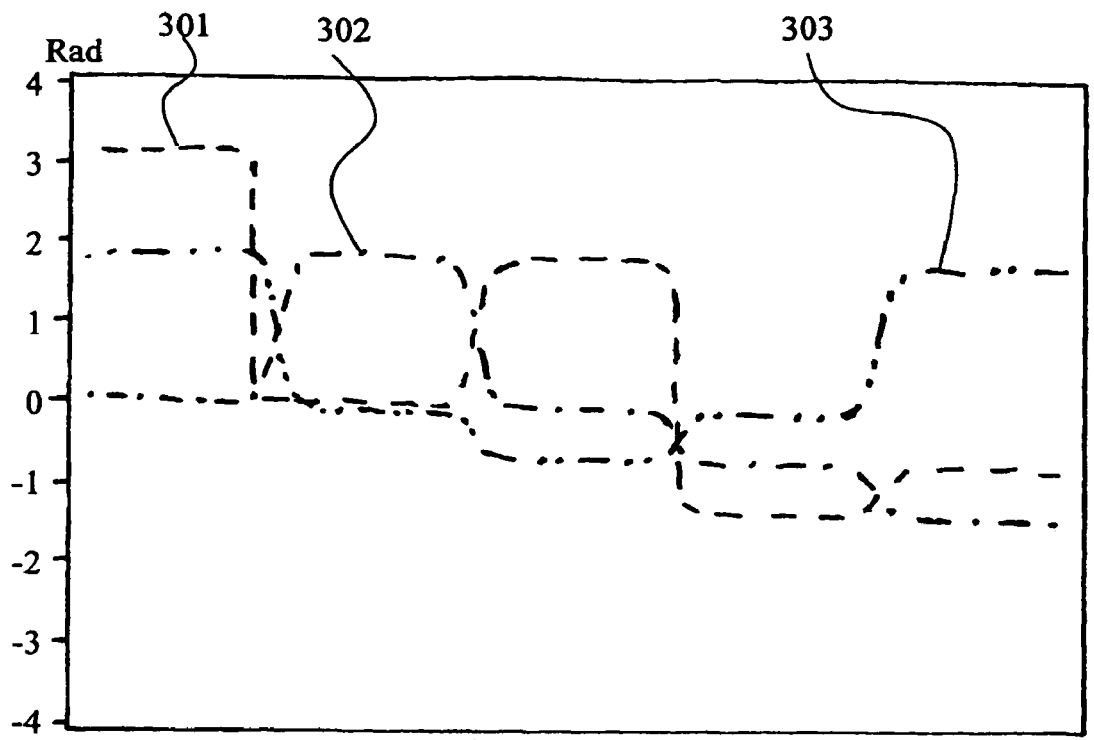
FIGS. 3a–3b show different phase distributions.

FIG. 3a shows phase distributions of self-images at interface B in FIG. 1 from the top three input waveguides 101–103. That is, a light image entering the MMI waveguide 106 in FIG. 1 at access waveguide 101 will have a power distribution according to FIG. 2 and a phase distribution according to dashed line 301 in FIG. 3a. A light image entering the MMI waveguide 106 at access waveguide 102 will have a power distribution similar to the power distribution in FIG. 2 but quite another phase distribution according to the dash-dot line denoted 302 in FIG. 3a. Similarly an image entering the MMI waveguide at access 103 will have a phase distribution according to the dash-dot-dot line 303 in FIG. 3a.

Figure 3B:
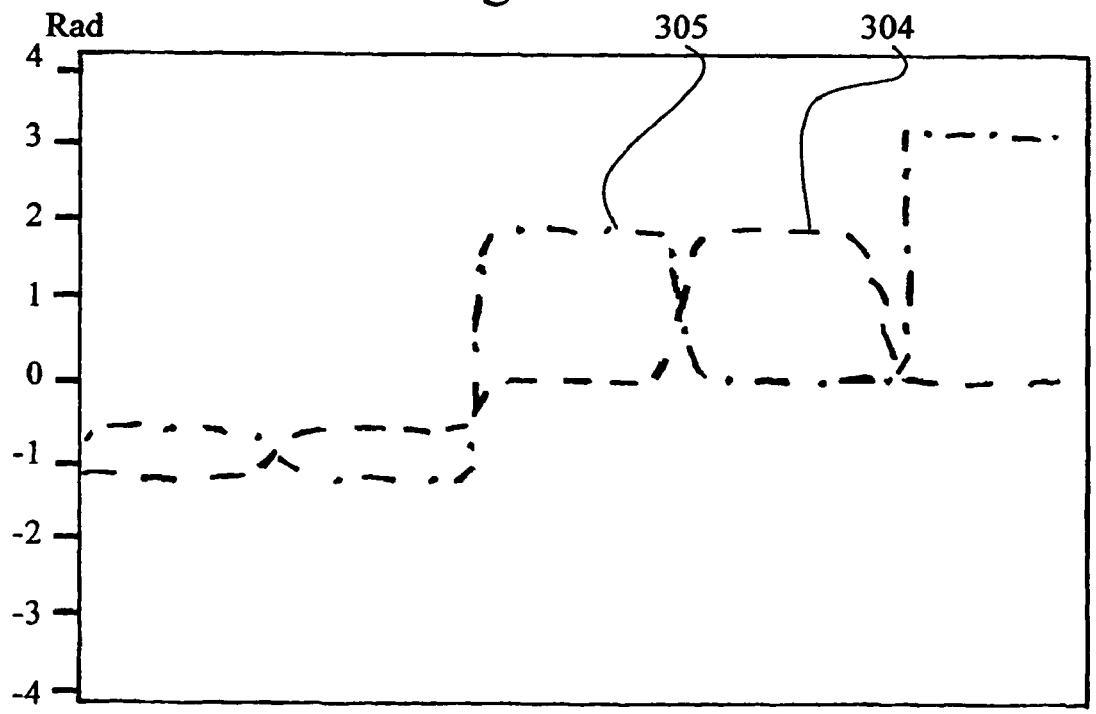

For ease of reference, the phase distribution of an image entering the MMI waveguide 106 at access waveguide 104 is plotted with a dashed line in FIG. 3b and denoted 304. Finally, the phase distribution of an image entering the MMI waveguide at the access waveguide 105 is plotted with a dash-dot line in FIG. 3b and denoted 305.

The MMI waveguide 106 in FIG. 1 is reciprocal. At interface B five phase shifters are arranged and denoted 109–113. Reflector means (not shown) are arranged to reflect incident light. The phase shifters 109–113 also comprises means for controllably shift the phase of incident light. Since an input image, entering the MMI waveguide 106 at access waveguide 103, will produce a power intensity distribution according to FIG. 2 and a phase distribution according to line 303 in FIG. 3, and since the MMI waveguide is reciprocal, a power distribution according to FIG. 2 at interface B, with a phase distribution according to line 303 in FIG. 3, propagating in the opposite direction to direction 107 will produce a single self-image at access waveguide 103.

To switch a signal, entering access waveguide 102, to exit access waveguide 103, the device in FIG. 1, thus operates as follows. The optical signal will enter the MMI waveguide 106 and produce five self-images at interface B according to FIG. 2, with a phase distribution according to line 302 in FIG. 3. The phase shifters 109–113 are controllably set to shift the phase of the incident light to coincide with the phase distribution according to line 303 in FIG. 3 after reflection and completely passing the phase shifters.

It is of course possible to fine-tune the phase shifters to reproduce accurate shifting to mimic the phase distribution 303 to the best possible extent. This way a reflection is created, at interface B, with a phase distribution according to 303 in FIG. 3, propagating opposite to direction 107, giving a single self-image at access waveguide 103. Thus, a dynamic switching is achieved from access 102 to access 103. By shifting the phase of the incident light of the signal going into the MMI waveguide the signal can be switched to any of the access waveguides 101–105, i.e. including the input access waveguide. There is in principal no limitation to the number of input and output access waveguides, i.e. a P×Q MMI waveguide switch. If separate input and output access waveguides are required then the number of access waveguides N is equal to P+Q, alternatively if same input and output access waveguides are used an N×N switch is required.

Figure 4:
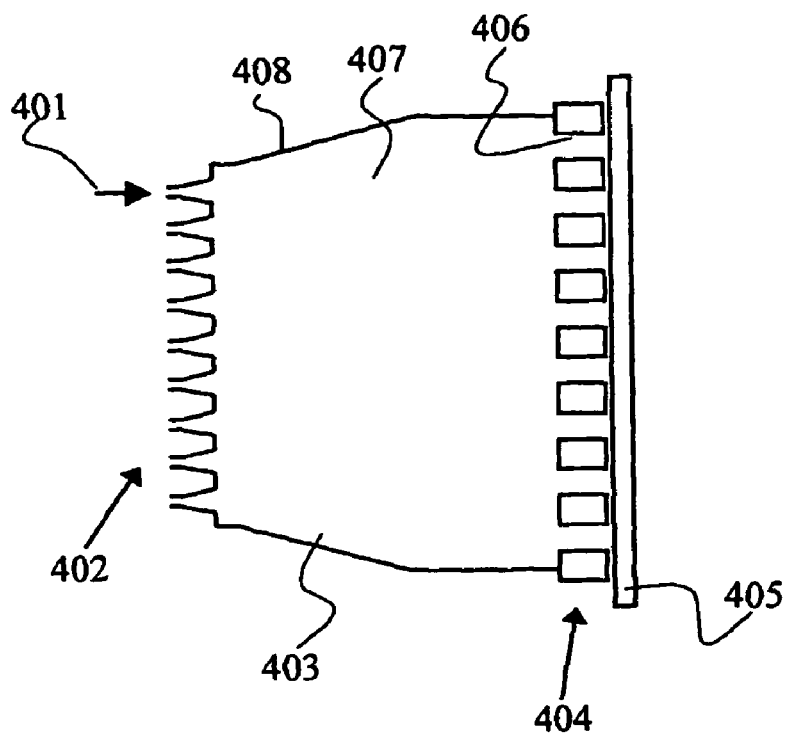
FIG. 4 shows a schematic view of a device according to a second preferred embodiment of the invention.

FIG. 4 shows a device according to a second preferred embodiment of the invention. This device is a 1×8 switch with one input access waveguide 401, and 8 output access waveguides commonly denoted 402. Nine individually controllable phase shifters 404 are used to control the phase front of an incident light image. Each phase shifter comprises a transparent media having refractive index, which is controllable by applying a voltage across said media. It is also possible to use a thermo-optical material, in which varying the temperature controls the refractive index. By varying the refractive index of the phase shifters 404 the optical path length is controllable and thus the phase front of an incident light image. A broad band reflection section 405 reflects the phase-adjusted image to the selected output access waveguide 402. The MMI waveguide 403 comprises an adiabatic taper section 407 with an angle $\theta_T$ 408. Since the phase if the incident light is tuned over a relatively long distance, i.e. during the travel through the phase shifters 404, the intensity distribution of the light change during the distance through the phase shifters 404. By having an adiabatic tapering of the waveguide, i.e. with no coupling to higher modes, a slower change of the intensity distribution of the incident light will occur. Thus a more effective switching is achieved with substantially reduced cross-talk and also reduced power loss.

In design of the device concern should be taken in that not only the incident light will pass the phase shifters, and the transparent part with adjusted refractive index, but also reflected light. This needs to be considered in the design of the phase shifters so that a proper phase tuning is achieved. The phase shifters are properly isolated between each other 406 so that minimal cross talk occurs.

Figure 5:
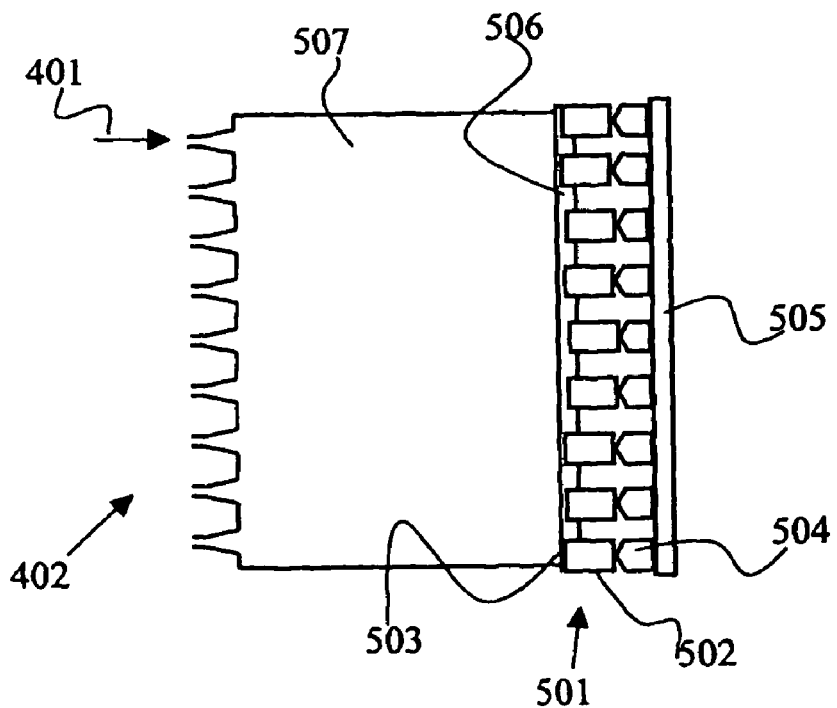
FIG. 5 shows a schematic view of a device according to a third preferred embodiment of the invention.

FIG. 5 shows a 1×8 switch according to a third preferred embodiment of the invention. Like details are denoted by same numerals. Phase shifters, commonly denoted 501, comprise a first part 502 having a broad band reflection side 503 arranged to reflect incident light. Said first part is arranged to be movable in the direction of light propagation in the MMI waveguide. Preferably, said first part 502 is spring-loaded to take a first position and is movable in a direction towards said access waveguides 401 and 402 to a second position, by a second part 504 of said phase shifter 501. Said second part is a micro-mechanical device which controllable pushes said first part 502 towards said access waveguides, thereby shortening the geometrical distance for incident light, which enables fine-tuning of the phase of said incident light. Each of said micro-mechanical devices 504 is individually controllable by a control means 505. In this preferred embodiment the MMI waveguide has no tapered section since the change of phase of the incident light takes place over a relatively short distance. Thus no considerations need to be taken with regards to changes of intensity distribution.

Refractive index matching means 506 is used to match the refractive index in the MMI waveguide 507. This is necessary since the phase shifters will move and gaps, with for instance air or vacuum, could occur in the interface between the phase shifters 501 and the MMI waveguide. The index matching means is for instance a fluid with same refractive index as the MMI waveguide. In this case it is preferable to put the fluid under pressure to prohibit formation of bubbles. It is also possible to use a soft material, which will follow the movements of the phase shifters, such as silica-rubber.

Figure 6:
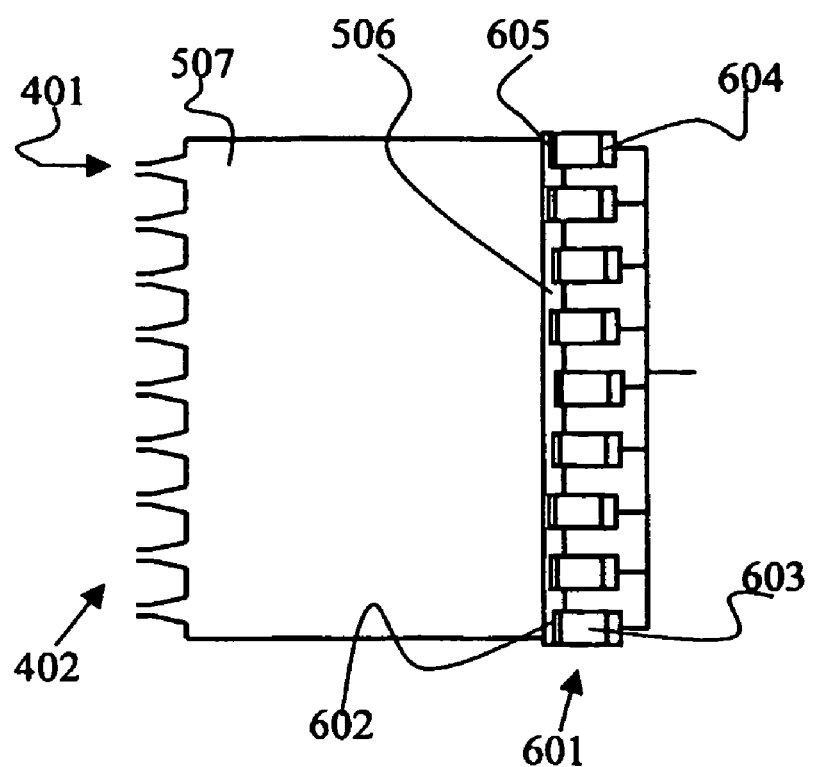
FIG. 6 shows a schematic view of a device according to a fourth preferred embodiment of the invention.

FIG. 6 shows a 1×8 switch according to a fourth embodiment of the invention. Like details are denoted with same numerals. Nine phase shifters 601 are individually controllable. A broad band reflection section 602 is located on a thermo-expansion part 603. Said thermo-expansion part 603 moves said broad band reflection section in direction parallel to light propagation in said MMI waveguide. The thermo-expansion part 603 is controlled by a heating element 604. Thus, it is possible to individually control each phase shifter, by application of heat through said heating element, to tune the phase of an incident light image. To avoid thermal cross-talk and to avoid changing the refractive index of the index matching means 506 by changing its temperature, a thermal insulation layer 605 is applied between the thermal expansion part 603 and the index matching means 506.

Figure 7:
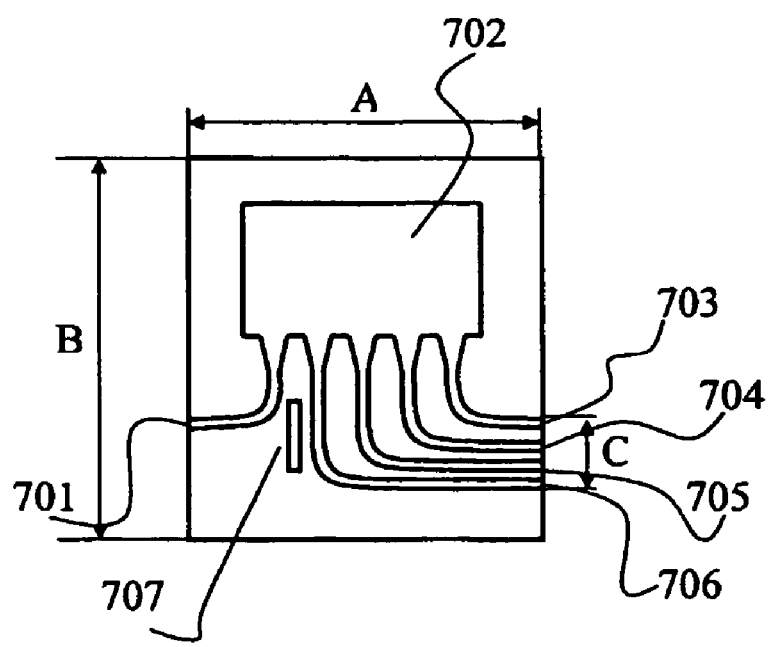
FIG. 7 shows a schematic view of a 1×4 switch according to an embodiment of the invention.

FIG. 7 shows a 1×4 switch with an input waveguide access port 701 coupled to an MMI waveguide switch device 702. Four output waveguide access ports is denoted 703, 704, 705 and 706, respectively. An isolation plate 707 is arranged to prevent cross talk between the input access waveguide 701 and the output access waveguides 703–706. The switch is approximately 5 mm wide, distance A, and 10 mm high, distance B with index contrast Δ=1.5%

$$(\Delta = \frac{n_k - n_{clod}}{n_{clod}}).$$

The figure is not to scale, for instance is the distance C across the output ports 703–706 approximately 1 mm.

The invention claimed is:

1. A device for space selective switching of an optical signal from an input access waveguide to a first selected output access waveguide, said device comprising:

a multi-mode interference (MMI) waveguide having at a first side a number, N, of accesses for connection of access waveguides, said MMI waveguide having a length, in light propagating direction, so that an image at an I:th access waveguide will produce N self-images at a second side opposite to said first side, where N is an integer greater than 1, reflective means located in said MMI waveguide close to said second side, arranged to reflect said N self-images towards said first side of said MMI waveguide, and means comprising N individual phase shifters arranged in line perpendicular to the propagation direction of incident light at said second side, for adjusting the phase of each of said self-images to create a single self-image at said selected output access waveguide, wherein said reflective means is arranged on a surface, facing the light propagating direction, of each of said phase shifters, and wherein each of said phase shifters comprises means for adjusting its position in a direction parallel to the light propagation direction in said MMI waveguide.

2. The device according to claim 1, wherein the N self-images, originating from said optical signal entering said MMI waveguide at the i:th access waveguide, has each a phase $P_{n,i}$ construing a set $P_i$ describing a phase distribution of the self-images, at said second side, and said means for adjusting the phase of each, self-image is arranged to adjust the phase distribution $P_i$, at said second side, for self-images from an input access waveguide i, to coincide with the phase distribution $P_j$ for a selected output access waveguide j.

3. Device according to claim 1, wherein each of said phase shifters comprises means for adjusting the refractive index of at least a part of said phase shifters.

4. Device according to claim 3, wherein the refractive index is adjusted by one of adjusting the temperature and applying a voltage across at least a part of said phase shifter.

5. Device according to claim 1, wherein at least a part of said phase shifter is construed of a thermal-expansive material, said position adjusting means is a temperature adjusting means, and that said temperature adjusting means is coupled to said at least part of said phase shifter so that a change in temperature of said temperature adjusting means change the length of said phase shifter.

6. Device according to claim 1, wherein at least a part of each of said phase shifters are movable in a direction parallel to the light propagation direction in said MMI waveguide, and wherein said position adjusting means is a micro-mechanical device arranged to move said at least a part of said phase shifters in said light propagation direction.

7. Device according to claim 1, wherein the refractive index matching means is applied between said MMI waveguide and each of said phase shifters.

8. Device according to claim 1, wherein each of said phase shifters are arranged side-by-side with an isolation distance in between.

9. A method for switching an optical signal from a first input access waveguide to a first selected output access waveguide, said first input access waveguide and a set of output access waveguides are connected to a first side of an MMI waveguide, the method comprising:

producing a first set of N self-images, where N is an integer, greater than 1 at a second side of said MMI waveguide from an image appearing at said input access waveguide, adjusting phase of each of said N soft-images to create a single self-image at said selected output access waveguide utilizing N individual phase shifters arranged in line perpendicular to the propagation of incident light at said second side, and reflecting said N self-images towards said first side of said MMI waveguide by arranging reflective means facing the light propagating direction of each of said phase shifters, wherein each of said phase shifters comprises means for adjusting position in a direction parallel to the light propagation direction in said MMI waveguide.

10. Method according to claim 9, further comprising the step of adjusting a refractive index, M, of said phase shifters.

11. Method according to claim 9, further comprising the step of adjusting the refractive index, M, of said phase shifters for controlling optical path length and a phase front of each of said self images.

* * * * *

UNITED STATES PATENT AND TRADEMARK OFFICE
CERTIFICATE OF CORRECTION

PATENT NO. : 7,035,500 B2 Page 1 of 1
APPLICATION NO. : 10/490840
DATED : April 25, 2006
INVENTOR(S) : Augustsson It is certified that error appears in the above-identified patent and that said Letters Patent is hereby corrected as shown below:

On the Title Page, under Item (57) "ABSTRACT", Line 10, after "integer" insert -- greater --.

In Column 7, Line 1, in Claim 9, delete "soft-images" and insert -- self-images --, therefor.

In Column 8, Line 1, in Claim 9, delete "adiusting" and insert -- adjusting --, therefor.

Signed and Sealed this

Twenty-seventh Day of November, 2007

JON W. DUDAS
*Director of the United States Patent and Trademark Office*